United States Patent
Kinpara

(10) Patent No.: US 10,246,161 B2
(45) Date of Patent: Apr. 2, 2019

(54) ELECTRIC POWER-ASSISTED BICYCLE AND DRIVE SYSTEM THEREFOR

(71) Applicant: Yamaha Hatsudoki Kabushiki Kaisha, Shizuoka-ken (JP)

(72) Inventor: Yuki Kinpara, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 135 days.

(21) Appl. No.: 15/633,756

(22) Filed: Jun. 27, 2017

(65) Prior Publication Data
US 2018/0009503 A1    Jan. 11, 2018

(30) Foreign Application Priority Data

Jun. 28, 2016 (JP) ................................. 2016-128015

(51) Int. Cl.
| | | |
|---|---|---|
| B62M 6/50 | (2010.01) | |
| B62M 6/55 | (2010.01) | |
| B62M 6/45 | (2010.01) | |
| B62M 6/90 | (2010.01) | |
| B62M 9/06 | (2006.01) | |

(52) U.S. Cl.
CPC ............... B62M 6/50 (2013.01); B62M 6/45 (2013.01); B62M 6/55 (2013.01); B62K 2207/02 (2013.01); B62M 6/90 (2013.01); B62M 9/06 (2013.01)

(58) Field of Classification Search
CPC ............. B62M 6/45; B62M 6/50; B62M 6/55
See application file for complete search history.

(56) References Cited

U.S. PATENT DOCUMENTS

| | | | | |
|---|---|---|---|---|
| 6,247,548 | B1 * | 6/2001 | Hayashi | .............. B60L 11/1801 180/206.2 |
| 8,634,979 | B2 * | 1/2014 | Chien | ...................... B62M 6/50 280/282 |
| 8,649,938 | B2 * | 2/2014 | Matsumoto | ........... B60W 10/04 701/36 |
| 9,085,341 | B2 | 7/2015 | Tsai et al. | |

(Continued)

FOREIGN PATENT DOCUMENTS

| | | |
|---|---|---|
| CN | 103863507 A | 6/2014 |
| CN | 105270556 A | 1/2016 |

(Continued)

OTHER PUBLICATIONS

Search Report dated Nov. 15, 2017, for corresponding EP Patent Application No. 17177644.6.

*Primary Examiner* — Kevin Hurley
(74) *Attorney, Agent, or Firm* — HEA Law PLLC

(57) ABSTRACT

An electric power-assisted bicycle, comprising: a torque sensor for detecting pedaling force applied to the pedal; an inclination angle sensor for detecting rocking of the bicycle body in a lateral direction; an electric motor that assists drive of a drive wheel driven by pedaling of the rider; and a controller that controls the electric motor based on the pedaling force. The controller has a first mode and a second mode as control modes of the electric motor. The second mode is executed when the controller determines that the rider pedals the bicycle while rocking the bicycle body in the lateral direction. The controller executes different control in the second mode from that in the first mode to assist the drive of the drive wheel.

15 Claims, 12 Drawing Sheets

(56) References Cited

U.S. PATENT DOCUMENTS

| | | | |
|---|---|---|---|
| 9,376,163 B2 | 6/2016 | Arimune et al. | |
| 9,545,855 B2 | 1/2017 | Takamoto et al. | |
| 2015/0292934 A1* | 10/2015 | Baumgaertner | B62M 6/50 701/22 |
| 2016/0375957 A1* | 12/2016 | Hashimoto | B62M 9/122 474/70 |
| 2016/0375958 A1* | 12/2016 | Hashimoto | B62M 9/122 701/58 |
| 2017/0057595 A1* | 3/2017 | Peng | B62M 6/50 |
| 2017/0355420 A1* | 12/2017 | Tsuchizawa | B62M 6/45 |
| 2018/0029666 A1* | 2/2018 | Shahana | B62M 6/50 |
| 2018/0257743 A1* | 9/2018 | Tsuchizawa | B62M 25/08 |

FOREIGN PATENT DOCUMENTS

| | | |
|---|---|---|
| JP | 2014-139068 A | 7/2014 |
| JP | 2016-008044 A | 1/2016 |
| TW | 201406604 A | 2/2014 |
| WO | 2011/072942 A1 | 6/2011 |
| WO | 2013/029925 A1 | 3/2013 |

* cited by examiner

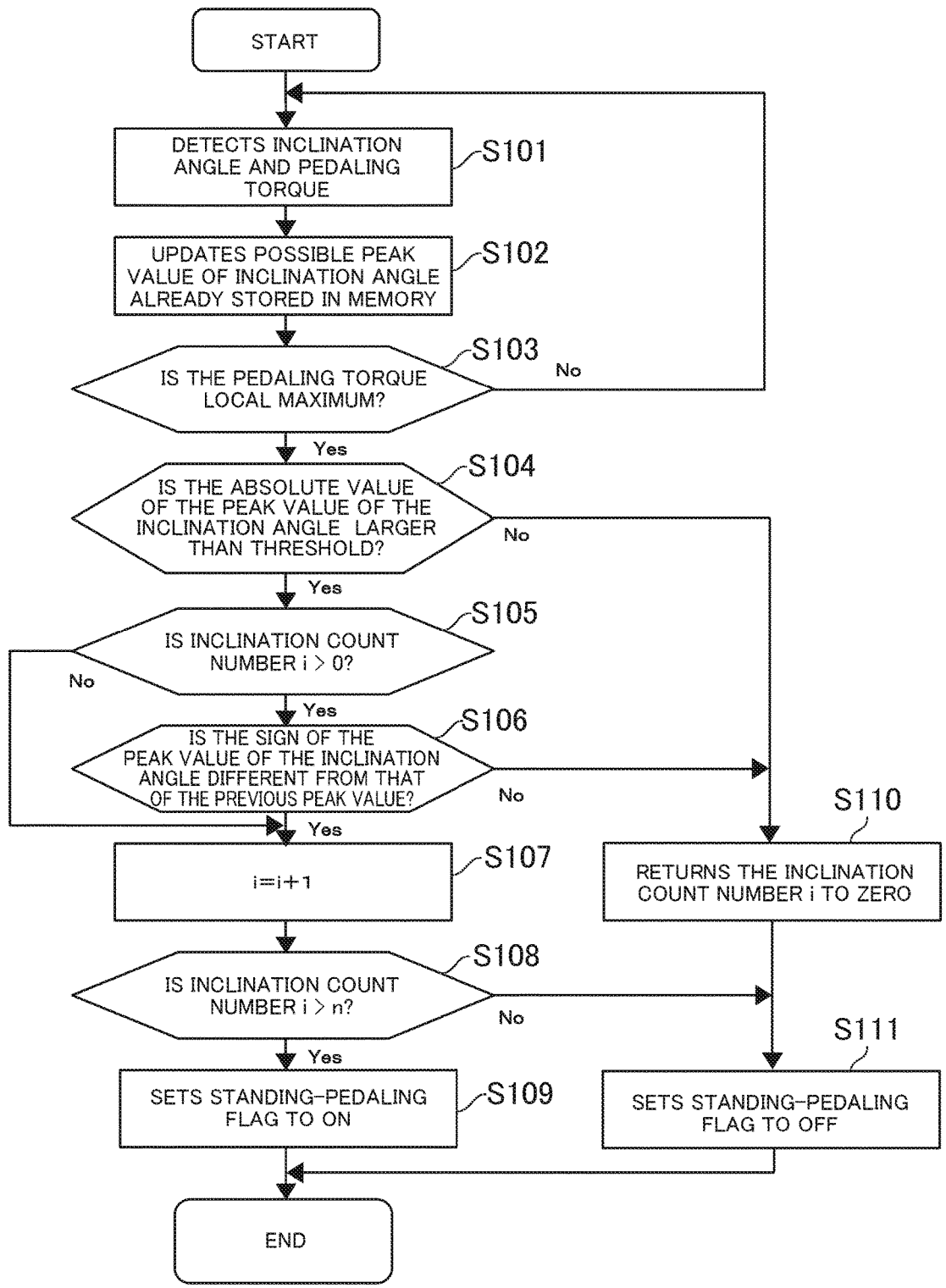

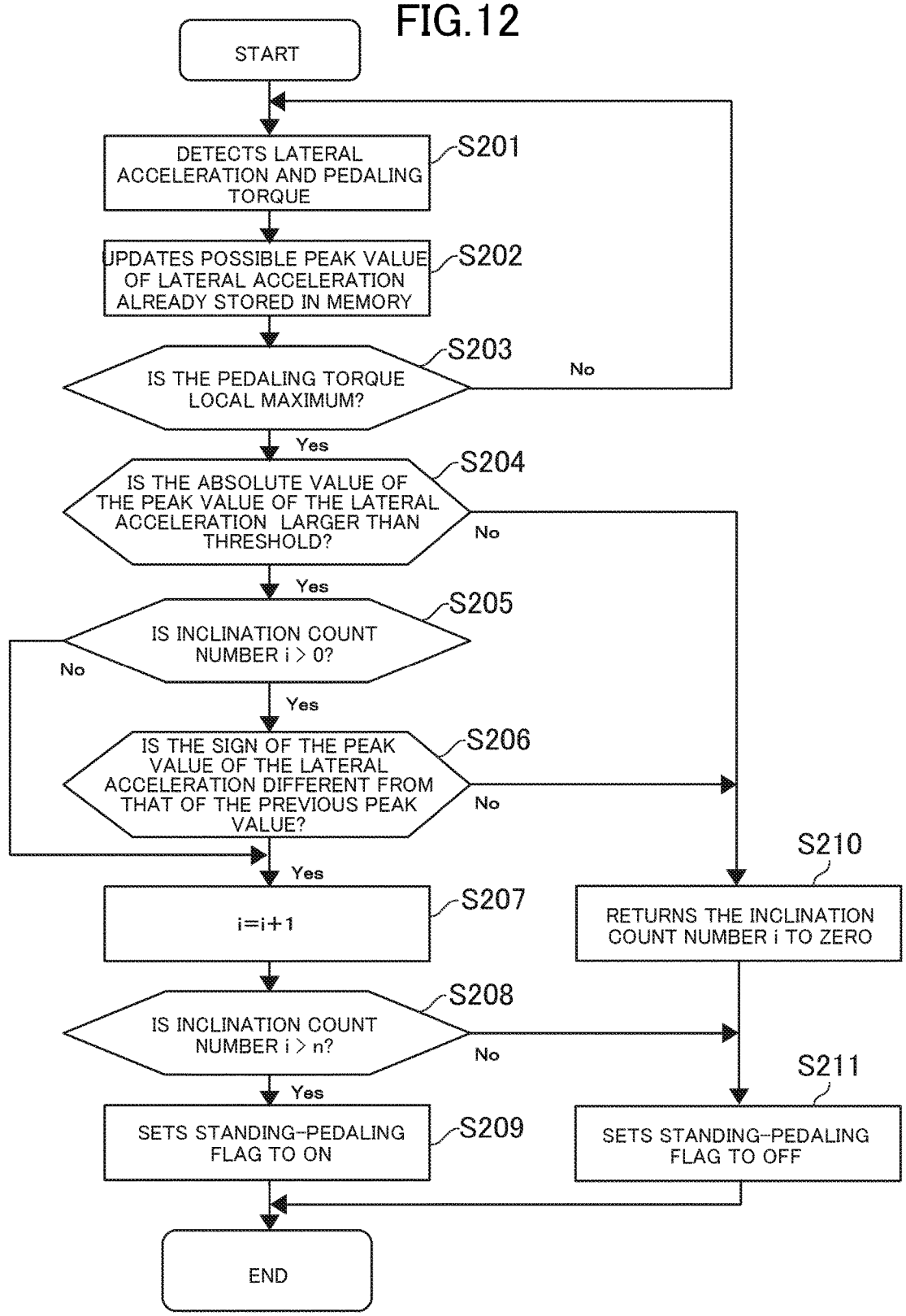

ELECTRIC POWER-ASSISTED BICYCLE AND DRIVE SYSTEM THEREFOR

CROSS-REFERENCE TO RELATED APPLICATION

The present application claims priority from Japanese application JP2006-128015 filed on Jun. 28, 2016, the content of which is hereby incorporated by reference into this application.

BACKGROUND OF THE INVENTION

1. Field of the Invention

The present invention relates to an electric power-assisted bicycle and a drive system mounted thereon.

2. Description of the Related Art

Electric power-assisted bicycles that include an electric motor for assisting a force applied by a rider to pedals on the bicycles are known (the force applied by a rider is referred to as a "pedaling force"). Such a bicycle is described in Japanese Unexamined Patent Publication No. 2014-139068, for example. The pedaling force is normally detected by a torque sensor provided in the crank shaft, and the electric motor outputs an assisting torque corresponding to the pedaling force.

SUMMARY OF THE INVENTION

Riders sometimes pedal bicycles while standing on the pedals and rocking the bicycle body in the lateral direction. In this case, it is not necessarily preferable to control the electric motor so that the electric motor outputs an assisting torque having the same magnitude as the assisting torque in normal-pedaling. For example, when going on a steep uphill road, the rider may pedal the bicycle while rocking the bicycle body in the lateral direction. In this case, an assisting torque larger than that in normal-pedaling enables the rider to go up the uphill road more comfortably.

One object of the present disclosure is to propose an electric power-assisted bicycle that enables more comfortable riding when a rider pedals the bicycle while rocking the bicycle body in the lateral direction and an object to propose a drive system mounted on the bicycle.

(1) A drive system proposed in the present disclosure comprises: a first sensor for detecting pedaling force applied to a pedal from a rider; a second sensor for detecting rocking of a bicycle body in a lateral direction; an electric motor that assists drive of a drive wheel driven by pedaling of the rider; and a controller that controls the electric motor based on the pedaling force. The controller has a first mode and a second mode as control modes of the electric motor. The first mode is executed in a normal-pedaling situation. The second mode is executed when the controller determines based on at least output of the second sensor that the rider is pedaling the bicycle while rocking the bicycle body in the lateral direction. The controller executes a different control in the second mode from that in the first mode to assist the drive of the drive wheel.

The above described drive system enables more comfortable riding when a rider pedals the bicycle while rocking the bicycle body in the lateral direction.

(2) In the drive system according to (1), under a condition that a pedaling force detected by the first sensor in the second mode is the same as that in the first mode, power obtained from the electric motor in the second mode may be different from that in the first mode.

(3) In the drive system according to (1) or (2), when an inclination of the bicycle body in one direction of either a left direction or a right direction is defined as a first inclination and an inclination of the bicycle body in the other direction of either the left direction or the right direction is defined as a second inclination, the controller may determine that the rider pedals the bicycle while rocking the bicycle body in the lateral direction when the first inclination and the second inclination are detected a plurality of times in total. The above described system improves accuracy of the determination whether or not the rider pedals the bicycle while rocking the bicycle body in the lateral direction.

(4) In the drive system according to any one of (1) to (3), the controller may detect an inclination angle in the lateral direction of the bicycle body based on the output of the second sensor, and the controller may determine that the rider pedals the bicycle while rocking the bicycle body in the lateral direction, based on the inclination angle in the lateral direction of the bicycle body.

(5) In the drive system according to any one of (1) to (3), the controller may detect an acceleration in the lateral direction of the bicycle body based on the output of the second sensor, and the controller may determine that the rider pedals the bicycle while rocking the bicycle body in the lateral direction, based on the acceleration in the lateral direction of the bicycle body.

(6) The drive system according to any one of (1) to (5) may further comprise a sensor that has output depending on rotation position of the pedal. The controller may determine that the rider pedals the bicycle while rocking the bicycle body in the lateral direction, based on the output of the second sensor and the output of the sensor depending on the rotation position of the pedal. The above described system improves accuracy of the determination whether or not the rider pedals the bicycle while rocking the bicycle body in the lateral direction.

(7) in the drive system according to (6), the first sensor may be used as the sensor that has output depending on the rotation position of the pedal. This embodiment can reduce the number of parts in the above described system.

(8) The drive system according to (6) may further comprise a third sensor for detecting rotation of a crank shaft provided with the pedal. The third sensor may be used as the sensor that has output depending on the rotation position of the pedal.

(9) In the drive system according to any one of (1) to (8), the controller may control the electric motor in the first mode so that the electric motor outputs as assisting torque corresponding to a first assisting ratio and the pedaling force detected by the first sensor, and the controller may control the electric motor in the second mode so that the electric motor outputs an assisting torque corresponding to a second assisting ratio that is different from the first assisting ratio and the pedaling force detected by the first sensor.

(10) In the drive system according to any one of (1) to (9), the controller may control the electric motor in the first mode so that the assisting torque output from the electric motor changes due to rotation of a crank shaft provided with the pedal, and the controller may control the electric motor in the second mode so that a local minimum of the assisting torque in the second mode is higher than a local minimum of the assisting torque in the first mode. The above described system can increase power obtained from the electric motor in the second mode.

(11) In the drive system according to any one of (1) to (10), the controller may control the electric motor in the second mode so that amplitude of the assisting torque in the second mode is smaller than amplitude of the assisting torque in the first mode. The above described system can reduce the change of power obtained from the electric motor in the second mode.

(12) In the drive system according to any one of (1) to (9), the controller may control the electric motor in the second mode so that amplitude of the assisting torque in the second mode is larger than amplitude of the assisting torque in the first mode.

(13) In the drive system according to (12), the controller may control the electric motor in the first mode so that the assisting torque is constant without regard to change of the pedaling force applied to the pedal, and the controller may control the electric motor in the second mode so that the assisting torque changes.

(14) The drive system according to any one of (1) to (13) may further comprise a notification device that notifies the rider that the controller controls the electric motor in the second mode.

(15) Electric power-assisted bicycle of the present disclosure includes the drive system according any one of (1) to (14).

BRIEF DESCRIPTION OF THE DRAWINGS

FIG. 5(a) shows an example of a change of inclination angle when standing-pedaling. FIG. 5(b) shows an example of a change of pedaling torque when standing-pedaling.

FIG. 6 is a flowchart showing an example of the process executed by the standing-pedaling determination unit of the controller.

FIG. 12 is a flowchart showing an example of a process executed by the standing-pedaling determination unit of the controller of the electric power-assisted bicycle shown in FIG. 10.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, processes, steps, operations, elements, and/or components, but do not preclude the presence or addition of one or more other features, processes, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, processes and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
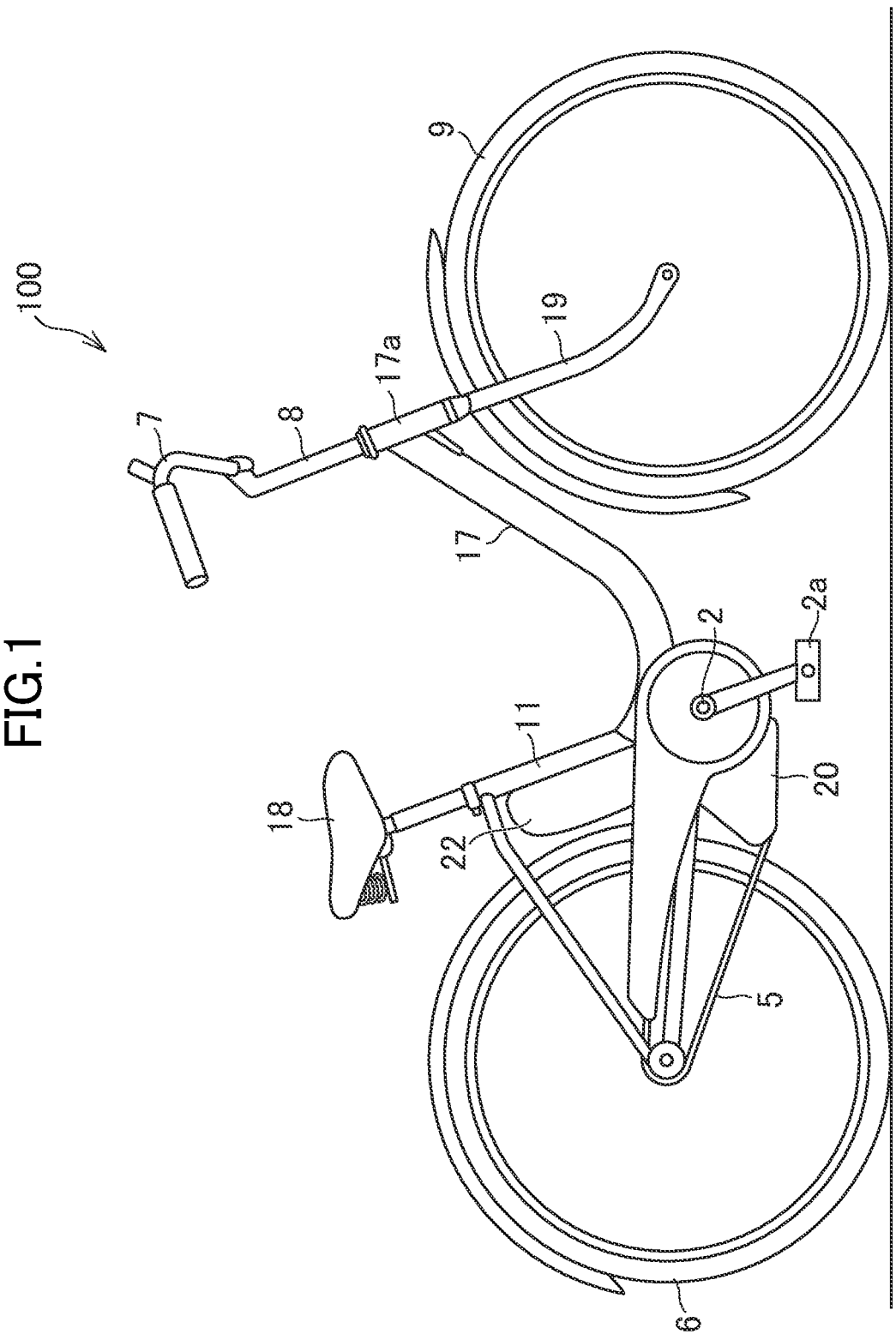
FIG. 1 is a side view showing an example of the electric power-assisted bicycle proposed in the present disclosure.
Figure 2:
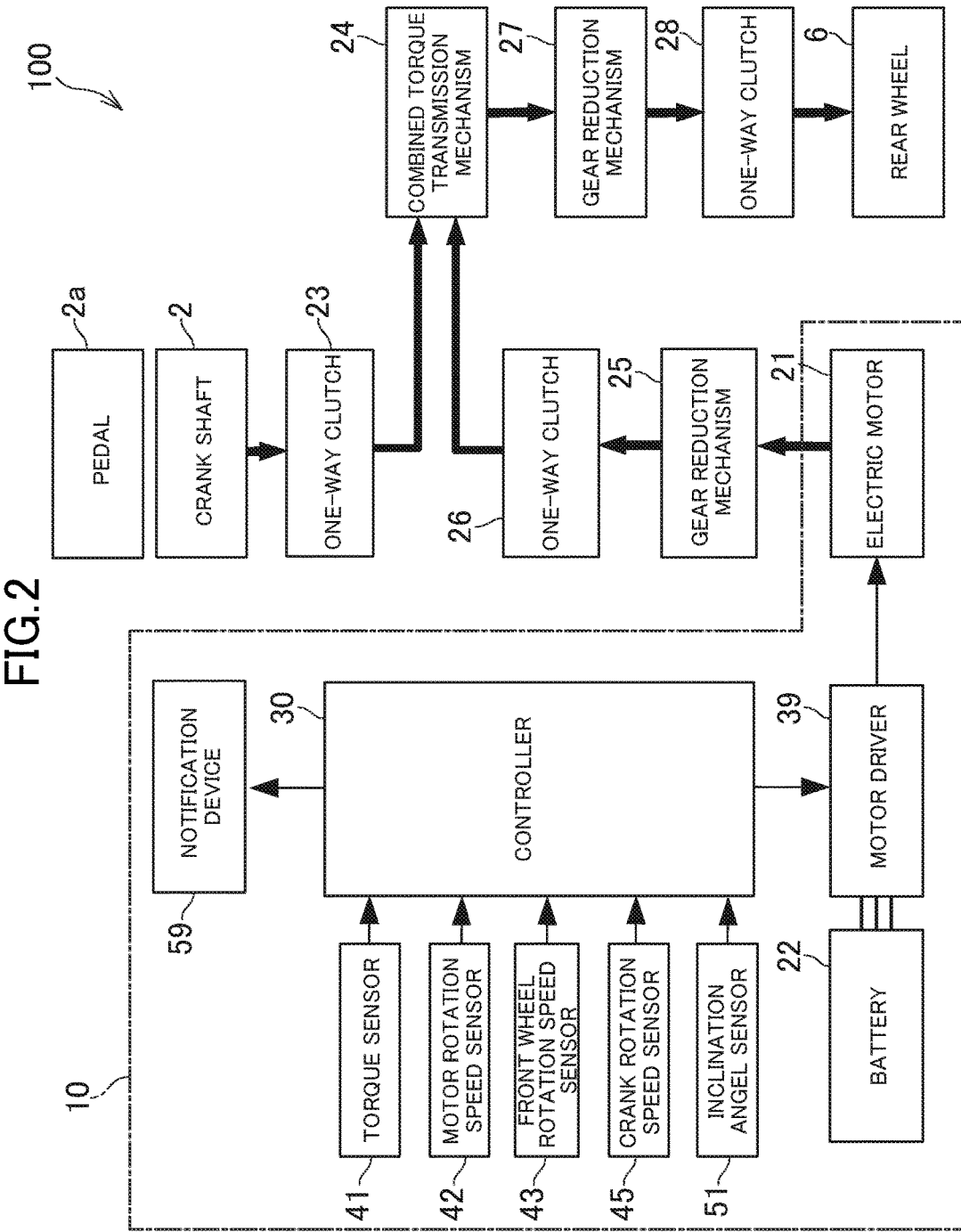
FIG. 2 is a block diagram of the electric power-assisted bicycle shown in FIG. 1.

FIG. 1 is a side view of an electric power-assisted bicycle 100 which is an example of embodiments of the present invention. FIG. 2 is a block diagram of the electric power-assisted bicycle 100. In FIG. 2, thick solid lines represent the transmission of the drive torque, and thin solid lines represent signals or electric currents. The electric power-assisted bicycle 100 includes a drive system 10 for assisting the rider's pedaling force. The drive system 10 is composed of electrical components such as an electric motor 21, a controller 30, a motor driver 39, and sensors 41, 42, 43, 45, 51 to be described later.

[Component of Bicycle]

As shown in FIG. 1, the electric power-assisted bicycle 100 includes a crank shaft 2. Pedals 2a are attached to both ends of the crank shaft 2, respectively. The crank shaft 2 is supported at the lower end of the saddle post 11. A saddle 18 is fixed to the upper end of the saddle post 11. The electric power-assisted bicycle 100 includes, in the front portion thereof, a handle post 8, a handle 7 fixed to the upper portion of the handle post 8, a front fork 19 fixed to a lower portion of the handle post 8, and a front wheel 9 supported at the lower end of the front fork 19. The handle post 8 is mounted on a head pipe 17a fixed to the front end of the frame 17. The shape of the frame 17 is not limited to the example shown in FIG. 1, and may be appropriately changed.

As shown in FIG. 1, the electric power-assisted bicycle 100 includes a drive unit 20. The drive unit 20 includes an electric motor 21 (see FIG. 2) that outputs assisting torque for assisting driving of the rear wheel 6 driven by pedaling of the rider, a gear reduction mechanism 25 (see FIG. 2), and the like. The electric motor 21 is driven by electric power supplied from the battery 22. In the example of the electric power-assisted bicycle 100, the battery 22 is attached to the rear-side of the saddle post 11, and the drive unit 20 is disposed behind the crank shaft 2. The arrangement of the electric motor 21 and the battery 22 is not limited to the example of the electric power-assisted bicycle 100, and may be appropriately changed.

A torque applied to the crank shaft 2 through the pedals 2a is transmitted to a combined torque transmission mechanism 24 through a one-way clutch 23 as shown in FIG. 2. In the example of the electric power-assisted bicycle 100, assisting torque is output from the electric motor 21 to be transmitted to the combined torque transmission mechanism 24 through the gear reduction mechanism 25 and the one-way clutch 26. The combined torque transmission mechanism 24 employs a shaft, a rotating member provided on the shaft, a chain 5 (FIG. 1) and the like. The combined torque transmission mechanism 24 combines the torque applied to the crank shaft 2 and the assisting torque output from the electric motor 21. In an example of the combined torque transmission mechanism 24, the two torques are input to a common shaft or a common rotating member to be combined. In another example, the torque applied to the crank shaft 2 and the torque output from the electric motor 21 may be input to the chain 5 to be combined. As shown in FIG. 2, the drive torque combined by the combined torque transmission mechanism 24 is transmitted to the rear wheel 6 through, for example, a transmission ratio change mechanism 27 and a one-way clutch 28. The electric power-assisted bicycle 100 may not have the transmission ratio change mechanism 27.

[Sensor]

The electric power-assisted bicycle 100 includes a sensor for detecting the pedaling force applied to the pedals 2a by the rider. This sensor is, for example, a torque sensor 41 (see FIG. 2) that outputs a signal corresponding to the torque of the crank shaft 2. The torque sensor 41 is, for example, a magnetostrictive sensor provided in the crank shaft 2, but may be other kinds of sensors. Hereinafter, the torque detected by the torque sensor 41, that is, the torque of the crank shaft 2 generated by the pedaling force applied to the pedals 2a by the rider is referred to as "pedaling torque".

The electric power-assisted bicycle 100 includes a motor rotation speed sensor (encoder) 42 that outputs a signal corresponding to the rotation speed of the electric motor 21, and a crank rotation speed sensor 45 that outputs a signal corresponding to the rotation speed of the crank shaft 2. Further, the electric power-assisted bicycle 100 has a front wheel rotation speed sensor 43 that outputs a signal corresponding to the rotation speed of the front wheel 9. The signals of the sensors 41, 42, 43, 45 are input to a controller 30 that controls the electric motor 21.

Figure 3:
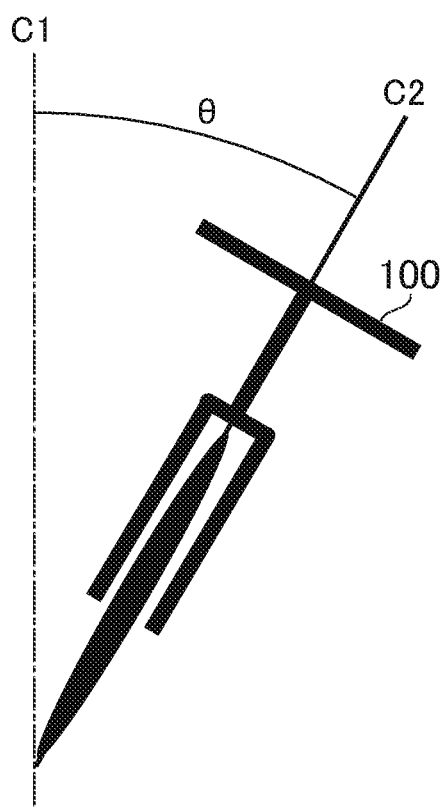
FIG. 3 schematically shows the front of the bicycle body.

The electric power-assisted bicycle 100 further includes a sensor for detecting rocking of the bicycle body in the lateral direction. The electric power-assisted bicycle 100 includes, for example, an inclination angle sensor 51 as the sensor for detecting rocking. The controller 30 detects the inclination angle in the lateral direction of the bicycle body, using the output of the inclination angle sensor 51. FIG. 3 is a front view that schematically shows the front of the bicycle body. In the present embodiment, the "inclination angle of bicycle body" is the angle θ from the straight line C1 along the vertical direction to the straight line C2 along the up and down direction of the bicycle body. The inclination angle sensor 51 is, for example, a biaxial acceleration sensor that outputs signals corresponding to acceleration in two orthogonal directions. The type of the inclination angle sensor 51 may be changed as long as it enables the controller 30 to calculate the inclination angle θ based on the output of the inclination angle sensor 51. For example, the inclination angle sensor 51 may employ a gyro sensor and an acceleration sensor. Alternatively, the inclination angle sensor 51 may be a liquid inclusion capacitance type. This type of sensor detects, as change of angle, change in electrostatic capacitance due to inclination of enclosed liquid. The inclination angle sensor 51 may employ a three-axis acceleration sensor.

[Controller]

The electric power-assisted bicycle 100 includes a controller 30 that controls the electric motor 21 based on the output of the torque sensor 41. The controller 30 includes a memory that includes programs and maps for control of the electric motor 21 and a microprocessor that executes the program. The controller 30 detects the pedaling torque based on the output of the torque sensor 41 and controls the electric motor 21 so that the electric motor 21 outputs assisting torque corresponding to the pedaling torque. The controller 30 outputs, to the motor driver 39, command value corresponding to target assisting torque. The motor driver 39 receives electric power from the battery 22 to supply electric power corresponding to the command value to the electric motor 21.

Riders sometimes pedal bicycles with their hips lifted from the saddle, while rocking the bicycle body to the left and right. For example, when going on an uphill road, a rider may pedal a bicycle while rocking the bicycle body to the left and right. When the rider pedals the bicycle while rocking the bicycle body to the left and right, the controller 30 executes a motor control different from that in a normal-pedaling to assist the driving of the rear wheel 6. Hereinafter, the riding manner that a rider pedals the bicycle with the hip lifted from the saddle, while rocking the bicycle body to the left and right is referred to as "standing-pedaling". The normal-pedaling is a riding manner other than the standing-pedaling. That is, the normal-pedaling is a pedaling performed when the controller 30 does not determine the standing-pedaling is being performed.

Figure 4:
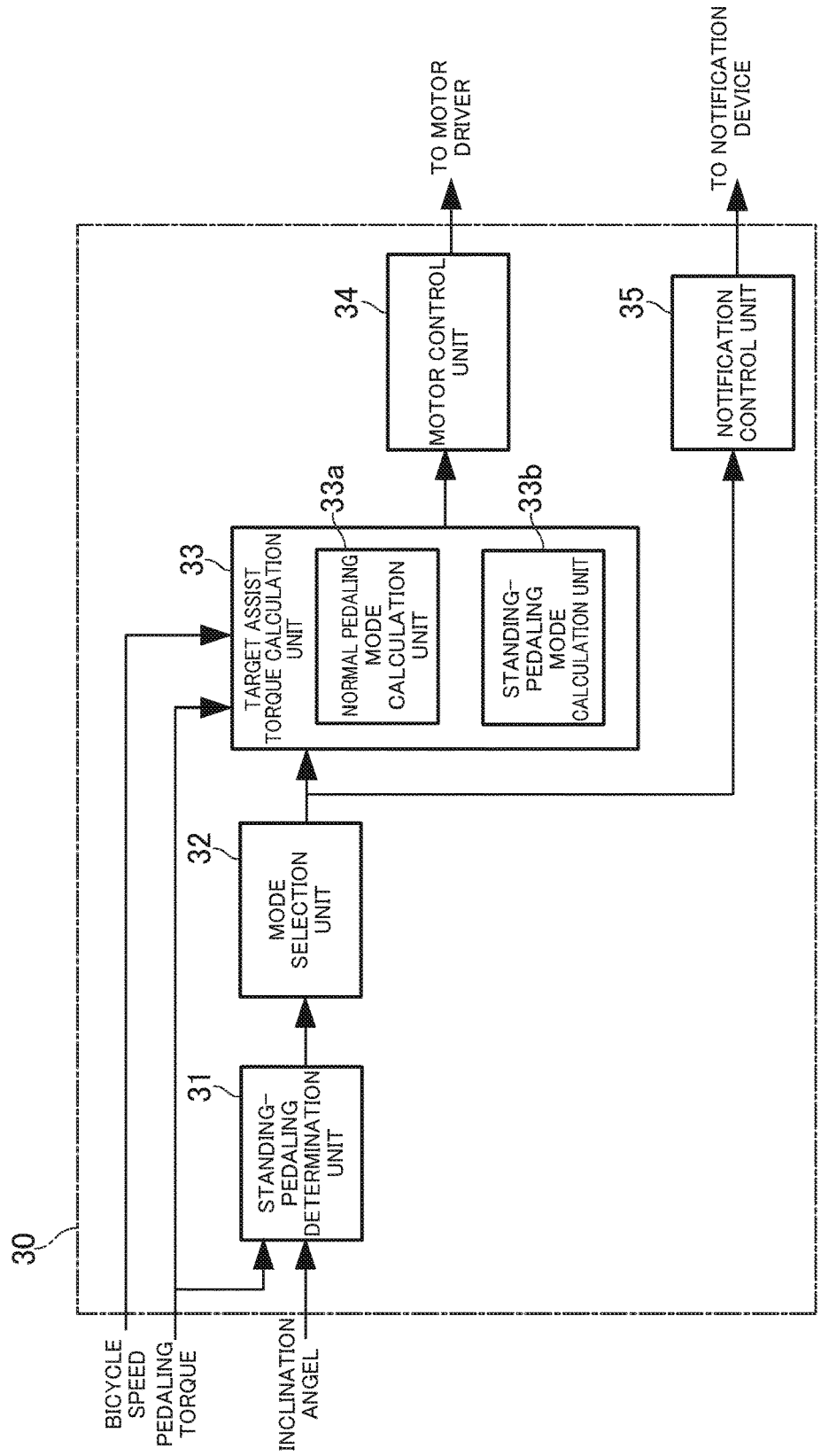
FIG. 4 is a block diagram showing processes executed by the controller.

FIG. 4 is a block diagram showing processes executed by the controller 30. The controller 30 has a standing-pedaling determination unit 31, a mode selection unit 32, a target assisting torque calculation unit 33, a motor control unit 34, and a notification control unit 35. The microprocessor of the controller 30 executes the programs stored in the memory to realize those units.

[Standing-Pedaling Determination Unit]

The standing-pedaling determination unit 31 determines whether the standing-pedaling is being performed or not. The standing-pedaling determination unit 31 determines that the standing-pedaling is being performed, for example, when an inclination of the bicycle body in the right direction and an inclination of the bicycle body in the left direction occur consecutively a plurality of times. The standing-pedaling determination unit 31 determines that the standing-pedaling is being performed, for example, when detecting an inclination (first inclination) of the bicycle body in one direction of either the left direction or the right direction and then detecting a next inclination (second inclination) in the opposite direction. As another example, the standing-pedaling determination unit 31 may determine that the standing-pedaling is being performed when detecting still another inclination (third inclination) in the one direction after detecting the second inclination. That is, the standing-pedaling determination unit 31 may determine that standing-pedaling is being performed when the inclination occurs three times.

The standing-pedaling determination unit 31 determines whether or not the standing-pedaling is being performed, based on the output of the inclination angle sensor 51. When two pedals 2a are positioned at the highest position and the lowest position in rotation position of the pedals 2a, respectively, the bicycle body is most inclined in the right or the left direction. Therefore, the standing-pedaling determination unit 31 detects inclination angle when the two pedals 2a reach the highest position (or a position near to the highest position) and the lowest position (or a position near to the lowest position), respectively. If the absolute value of the detected inclination angle is larger than a threshold value, the standing-pedaling determination unit 31 determines that the standing-pedaling is being performed. Such utilization of the movement of the pedals 2a improves the accuracy of the determination of standing-pedaling. For example, it is possible to distinguish between standing-pedaling and pedaling on a road continuously curved to the left and right. Moreover, it is possible to distinguish between standing-pedaling and pedaling on a bank ("bank" means a curved road with a slope that is higher on the outside).

For the accurate determination achieved by the utilization of the movement of pedals 2a, the standing-pedaling determination unit 31 determines whether or not the standing-pedaling is being performed, using a sensor that has output that changes due to the rotation of the crank shaft 2. An example of the sensor is the crank rotation speed sensor or the torque sensor 41. Alternatively, the standing-pedaling determination unit 31 does not necessarily use the sensor. In other words, the standing-pedaling determination unit 31 may determine whether the standing-pedaling is being performed, on the basis only of the output of the inclination angle sensor 51.

In the example of the electric power-assisted bicycle 100, the standing-pedaling determination unit 31 determines whether or not the standing-pedaling is being performed based on the inclination angle and the pedaling torque (that is, the output of the torque sensor 41). In detail, the standing-pedaling determination unit 31 determines whether or not the standing-pedaling is being performed, based on the inclination angle detected in a period or at a time specified by using the pedaling torque. In more detail, an inclination angle is detected in a period or at a time specified by the time point of the peak value (local maximum or local minimum) of the pedaling torque. When the absolute value of the inclination angle is larger than a threshold value, the standing-pedaling determination unit 31 determines the standing-pedaling is being performed. The process of the standing-pedaling determination unit 31 will be described in more detail.

Figure 5A:
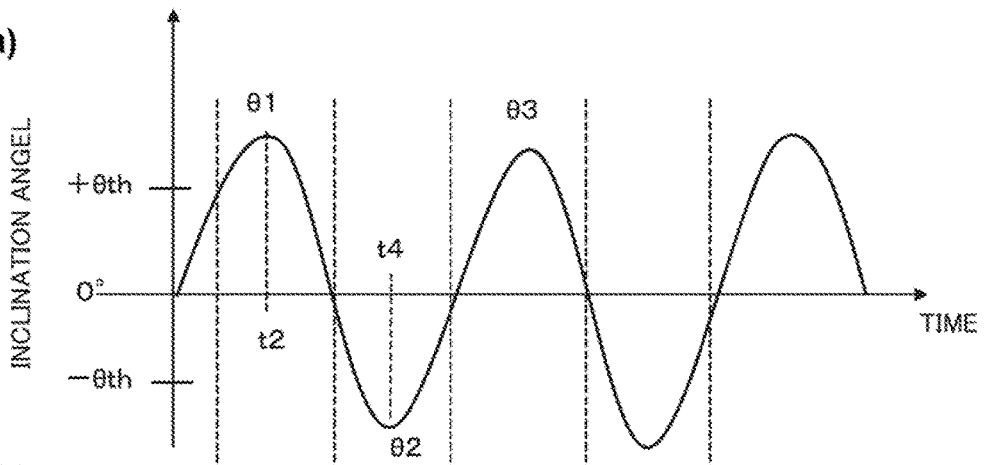
FIG. 5(a) and FIG. 5(b) illustrate a process executed by a standing-pedaling determination unit of the controller.
Figure 5B:
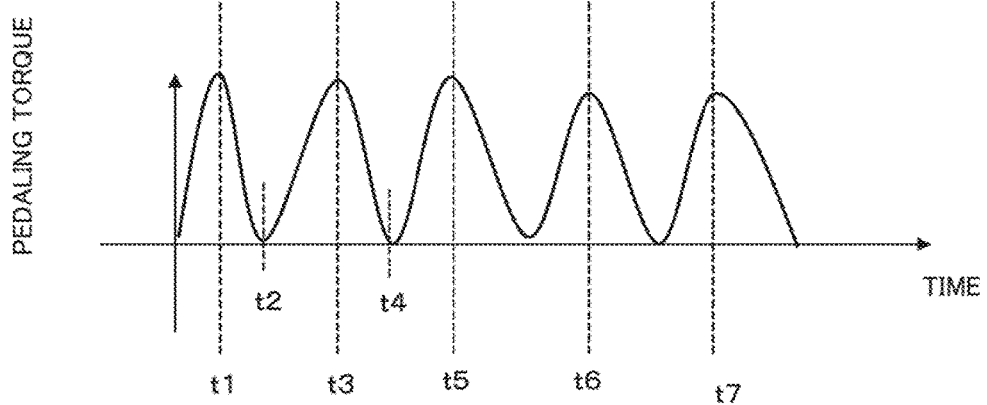

FIG. 5(a) and FIG. 5(b) illustrate a process executed by the standing-pedaling determination unit 31. FIG. 5 (a) exemplifies change of the inclination angle in the standing-pedaling. FIG. 5 (b) exemplifies change of the pedaling torque in the standing-pedaling. In FIG. 5(a), the horizontal axis represents time. In FIG. 5(b), the horizontal axis represents time.

As shown in FIG. 5(a) and FIG. 5(b), the inclination angle and the pedaling torque periodically change. When the two pedals 2a are located at the highest position and the lowest position in the rotation of the pedals 2a, the pedaling force applied by the rider is small. Therefore, as shown in FIG. 5(b), the time point having a local minimum of the pedaling torque (for example, time points t2 and t4) is the time point at which the two pedals 2a are located at the highest position and the lowest position, respectively. As described above, at the time point when the two pedals 2a are located at the highest position and the lowest position, the bicycle body is inclined most largely in either the right direction or the left direction. Therefore, at the time point having a local minimum of the pedaling torque (for example, at the time points of t2 and t4), the inclination angle is maximized or minimized. The standing-pedaling determination unit 31 uses this relationship between the inclination angle and the pedaling torque to determine whether the standing-pedaling is being performed.

[Detail of Standing-Pedaling Determination Unit]

In one example, the standing-pedaling determination unit 31 detects peak values of the inclination angle (each peak value is a local maximum or a local minimum in a period between two time points, each having a local maximum of the pedaling torque). The standing-pedaling determination unit 31 may determine whether or not the absolute values of the peak values are larger than a threshold value and further determines whether or not the signs (+ or −) of two consecutive peak values are different. This process enables the controller 30 to determine whether or not the bicycle body is rocking to the left and right in conformity with the rotation of the crank shaft 2 and determine whether the rocking is sufficiently large. When the plurality of results of the determinations are positive (Yes) consecutively, the standing-pedaling determination unit 31 determines that standing-pedaling is being performed. Referring to FIG. 5(a) and FIG. 5(b), the standing-pedaling determination unit 31 calculates a peak value (local maximum) θ1 of the inclination angle in a period between two time points (for example, t1 and t3) each having a local maximum of the pedaling torque. The standing-pedaling determination unit 31 may then determine whether or not the peak value θ1 is greater than a threshold θth. Further, the standing-pedaling determination unit 31 calculates a peak value (local minimum) θ2 of the inclination angle in a next period between two time points (for example, t3 and t5) each having a local maximum of the pedaling torque. The standing-pedaling determination unit 31 may then determine whether or not the absolute value of the peak value θ2 is larger than the threshold θth. Moreover, the standing-pedaling determination unit 31 determines whether or not the sign (+ or −) of the peak value θ2 is different from the sign of the peak value θ1. When the results of those determinations are positive (Yes), the standing-pedaling determination unit 31 determines that the standing-pedaling is being performed.

The number of times of the determinations is not limited to two. The standing-pedaling determination unit 31 may detect a peak value θ3 of the inclination angle in the further next period between two time points (for example, t5 and t6) each having a local maximum of the pedaling torque. The standing-pedaling determination unit 31 may then determine whether or not the absolute value of the peak value Θ3 is larger than the threshold θth, and then determine whether or not the sign of the peak value θ3 is different from the sign of the previous peak value θ2. When the results of those three consecutive determinations are positive (Yes), the standing-pedaling determination unit 31 may determine that the standing-pedaling is being performed. The number of times of the determinations may be more than three times.

In addition to the above described determinations, the standing-pedaling determination unit 31 may determine whether or not the local maxima of the pedaling torque are larger than a threshold.

The standing-pedaling determination unit 31 determines that riding has returned to the normal-pedaling when the peak value of the inclination angle of the bicycle body becomes smaller than the threshold θth after the standing-pedaling, for example. Alternatively, when the pedaling torque becomes smaller than a threshold value, the standing-pedaling determination unit 31 may determine that riding has returned to normal-pedaling.

FIG. 6 is a flowchart showing an example of processing executed by the standing-pedaling determination unit 31. The process shown in FIG. 6 is repeatedly executed at a predetermined cycle during operation of the bicycle.

First, the standing-pedaling determination unit 31 acquires an inclination angle and a pedaling torque (S101). The memory of the controller 30 has a storage area that stores a possible peak value (that is, maximum value or minimum value) of the inclination angle. The possible peak value is a value obtained after a time point of a previous local maximum of the pedaling torque. The standing-pedaling determination unit 31 updates the possible peak value already stored in the memory (S102). Specifically, when the absolute value of the inclination angle acquired in S101 is larger than the absolute value of the inclination angle already recorded in the memory, the standing-pedaling determination unit 31 newly sets, as the possible peak value, the inclination angle acquired in S101 in the memory. On the other hand, if the absolute value of the inclination angle acquired in S101 is smaller than the absolute value of the inclination angle already recorded in the memory, the inclination angle already recorded in the memory is maintained as the possible peak value. As a result of this processing, a peak value (for, example, the peak value θ2 shown in FIG. 5) is recorded in the memory.

Next, the standing-pedaling determination unit 31 determines whether or not the pedaling torque acquired in S101 is a local maximum (S103). For example, when the difference between the pedaling torque acquired in the previous process and the pedaling torque acquired in the present process is smaller than a threshold that is close to zero, the standing-pedaling determination unit 31 determines that the pedaling torque acquired in the present process (S101) is the local maximum. Process in S103 is not limited to that described here, and may be changed as appropriate.

If the pedaling torque acquired in S101 is not a local maximum in the determination of S103, the process of the controller 30 returns to S101. When the pedaling torque is a local maximum in the determination of S103, the standing-pedaling determination unit 31 determines whether or not the absolute value of the inclination angle (the peak value) recorded in the memory is larger than the threshold (S104). Specifically, referring to FIG. 5(a), the standing-pedaling determination unit 31 determines whether or not the absolute value of the peak value θ2 is greater than the threshold θth, for example. If the peak value recorded in the memory is larger than the threshold value in the determination of S104, the standing-pedaling determination unit 31 determines whether or not the number of times of the positive (Yes) results of the determinations in S104 is greater than zero (S105, hereinafter, the number of times of the positive (Yes) results of the determinations of S104 will be referred to as "inclination count number i"). In the case where the inclination count number i is zero (the result of the determination of S105 is "No"), the standing-pedaling determination unit 31 sets the inclination count number i to 1 (S107). When the inclination count number i is 1 or more (when the result of determination of S105 is "Yes"), the standing-pedaling determination unit 31 determines whether or not the sign (+ or −) of the inclination angle (for example, the peak value θ2 in FIG. 5(a)) is different from the sign of the previous peak value (S106) (for example, the peak value θ1 in FIG. 5(a)). When the signs of the two peak values are different from each other, the standing-pedaling determination unit 31 increases the inclination count number i by 1 (S107). The standing-pedaling determination unit 31 may then determine whether or not the inclination count number i is equal to or larger than a predetermined number n (S018). The predetermined number n is a number of 1 or more, preferably 2 or more. When the inclination count number i is equal to or larger than the predetermined number n, the standing-pedaling determination unit 31 determines that the standing-pedaling is being performed and sets the "standing-pedaling flag" recorded in the memory to ON (S109).

In S104, when the absolute value of the inclination angle (peak value) recorded in the memory is smaller than a threshold, that is, when the absolute value of the peak values θ1, θ2 shown in FIG. 5(a) is smaller than the threshold θth, the standing-pedaling determination unit 31 returns the inclination count number i to zero (S110). Also, if, in the determination of S106, the sign of the inclination angle (peak value) recorded in the memory is the same as the sign of the peak value of the inclination angle acquired in the previous period, that is, if the result of the result of the determination of S106 is "No", the standing-pedaling determination unit 31 returns the inclination count number i to zero (S110). When the inclination count number i is returned to zero, the standing-pedaling determination unit 31 sets the standing-pedaling flag recorded in the memory to OFF (S111). If, in the determination of S108, the inclination count number i is smaller than the predetermined number n, that is, if the result of the determination of S108 is "No", the standing-pedaling determination unit 31 sets the "standing-pedaling flag" recorded in the memory to OFF (S111).

According to the process described in FIG. 6, the standing-pedaling determination unit 31 determines that standing-pedaling is being performed when the signs (+ or −) of the peak values (local maximum or local minimum) of the inclination angle changes a plurality of times (n times in FIG. 6) and it is consecutively determined a plurality of times that the absolute values of the peak values are larger than the threshold.

[Modification of Standing-Pedaling Determination Unit]

The processing of the standing-pedaling determination unit 31 is not limited to the above example. As another example, the standing-pedaling determination unit 31 may determine whether or not the standing-pedaling is being performed, based on a peak value of the inclination angle and base on a pedaling torque acquired in the period specified by using the time point of the peak value of the inclination angle. Referring to FIG. 5(a) and FIG. 1(b), for example, the standing-pedaling determination unit 31 may determine that the standing-pedaling is being performed when (i) the absolute values of the peak values θ1 and θ2 of the inclination angle are larger than the threshold value, (ii) the signs of the peak values θ1 and θ2 axe different, and (iii) a local maximum of the pedaling torque acquired in the period between the time point t2 of the peak value θ1 and the time point t4 of the peak value θ2 is larger than a threshold value.

In still another example, the standing-pedaling determination unit 31 may use the change period of the inclination angle and the change period of the pedaling torque. Specifically, the standing-pedaling determination unit 31 may determine that the standing-pedaling is being performed, for example, when (i) the absolute value of the peak value of the inclination angle is larger than a threshold value, (ii) the local maximum of the pedaling torque is larger than a threshold value, and (iii) a difference between the change period of the inclination angle (for example, a period from a local maximum to a local minimum) and the change period of the pedaling torque (for example, a period from a local maximum to a local maximum) is smaller than a threshold value.

[Utilization of Crank Rotation Speed]

As described above, when two pedals 2a are located at the highest position and the lowest position respectively in the rotation of the pedals 2a, the pedaling force applied by the rider is small. Therefore, the rotation speed of the crank shaft 2 calculated from the output of the crank rotation speed sensor 45 also depends on the position of the crank shaft 2. Therefore, the standing-pedaling determination unit 31 may use the rotation speed of the crank shaft 2 calculated from the output of the crank rotation speed sensor 45, instead of the pedaling torque (hereinafter, the rotation speed of the crank shaft 2 is referred to as "crank shaft rotational speed"). Specifically, the standing-pedaling determination unit 31 may calculate the peak value (θ1, θ2, θ3 in FIG. 5(a), for example) of the inclination angle at a time point or in a period specified by time points of local maxima (or local minima) of the crank shaft rotational speed. The standing-pedaling determination unit 31 may then determine that the standing-pedaling is being performed when the absolute values of the peak values are larger than the threshold value. At this time, similarly to the above-described processing of the standing-pedaling determination unit 31 (for example, S106 in FIG. 6), the standing-pedaling determination unit 31 may determine whether or not the signs (+ or −) of two consecutive peak values are different.

Also, the rotational acceleration of the crank shaft 2 calculated from the output of the crank rotation speed sensor 45 depends on the rotational position of the crank shaft 2 like the pedaling torque exemplified in FIG. 5 (b). Therefore, the standing-pedaling determination unit 31 may use the rotational acceleration of the crank shaft 2 calculated from the output of the crank rotation speed sensor 45, instead of the pedaling torque (hereinafter, the rotational acceleration of the crank shaft 2 is referred to as "crank shaft rotational acceleration"). Specifically, the standing-pedaling determination unit 31 may calculate the peak value (θ1, θ2, θ3 in FIG. 5(a), for example) of the inclination angle at a time point or in a period specified by time points of local maxima (or local minima) of the crank shaft rotational acceleration. The standing-pedaling determination unit 31 may then determine that the standing-pedaling is being performed when the absolute value of the peak value is larger than the threshold value. At this time, similarly to the above-described processing of the standing-pedaling determination unit 31 (for example, S106 in FIG. 6), the standing-pedaling determination unit 31 may determine whether or not the signs (+ or −) of two consecutive peak values are different.

Alternatively, the crank rotation speed sensor 45 may output a signal corresponding to the rotation position of the crank shaft 2. In this case, the standing-pedaling determination unit 31 may detect a time point when the pedals 2a are located at the highest position or the lowest position, based on the output of the crank rotation speed sensor 45. The standing-pedaling determination unit 31 may then determine whether or not the absolute value of the inclination angle acquired at that time point is larger than a threshold value.

[Mode Selection Unit]

The controller 30 has a normal-pedaling mode and a standing-pedaling mode as the control mode of the electric motor 21. Further, the controller 30 includes a mode selection unit 32 (see FIG. 4). The mode selection unit 32 selects one mode of the normal-pedaling mode and the standing-pedaling mode, depending on the result of the determination executed by the standing-pedaling determination unit 31. In the example of electric power-assisted bicycle 100, when the standing-pedaling flag recorded in the memory of the controller 30 is ON, the mode selection unit 32 selects the standing-pedaling mode. On the other hand, when the standing-pedaling flag is OFF, the mode selection unit 32 selects the normal-pedaling mode.

[Target Assisting Torque Calculation Unit]

As described above, the controller 30 has a target assisting torque calculation unit 33 (see FIG. 4). The target assisting torque calculation unit 33 calculates a target assisting torque, that is, an assisting torque to be output from the electric motor 21. The target assisting torque calculation unit 33 includes a normal-pedaling mode calculation unit 33a for calculating the target assisting torque in the normal-pedaling mode and a standing-pedaling mode calculation unit 33b for calculating the target assisting torque in the standing-pedaling mode.

[Normal-Pedaling Mode Calculation Unit]

The normal-pedaling mode calculation unit 33a calculates target assisting torque according to, for example, pedaling torque (that is, the output of the torque sensor 41). More specifically, the normal-pedaling mode calculation unit 33a calculates the target assisting torque according to the pedaling torque and the bicycle speed. In the example of the electric power-assisted bicycle 100, a map and/or a calculation formula that expresses a relationship between the assisting ratio and the bicycle speed are stored in the memory of the controller 30 in advance (in the example of the present specification, the assisting ratio is defined by an expression "assisting ratio=assisting torque/pedaling torque"). The normal-pedaling mode calculation unit 33a calculates an assisting ratio corresponding to the bicycle speed detected by a sensor (for example, the front wheel rotation speed sensor 43) with reference to the map and/or the calculation formula stored in the memory. The normal-pedaling mode calculation unit 33a may then multiply the calculated assisting ratio by the pedaling torque, and sets the result of the multiplication as the target assisting torque.

Figure 7:
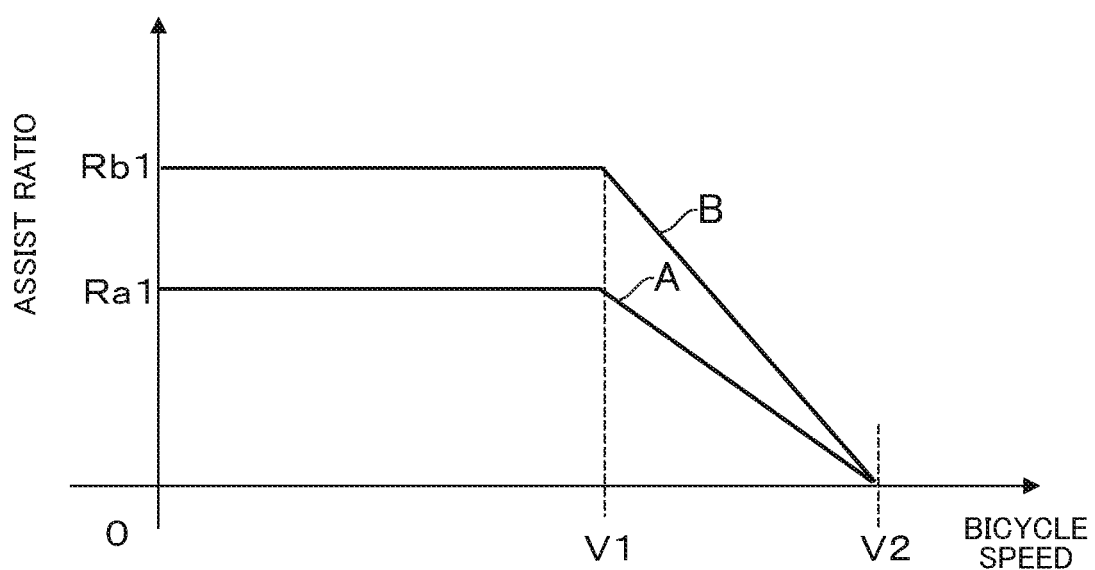
FIG. 7 is a diagram for explaining an example of a process executed by a target assisting torque calculation unit of the controller. This figure shows an example of a relationship between an assisting ratio and a bicycle speed.

FIG. 7 is a diagram for explaining an example of process executed by the target assisting torque calculation unit 33. In this figure, the horizontal axis represents bicycle speed and the vertical axis represents assisting ratio. In this figure, the solid line A shows the relationship between the assisting ratio and the bicycle speed in the normal-pedaling mode. The assisting ratio is a constant value Ra1 in a range where the bicycle speed is from 0 to V1. The assisting ratio gradually decreases in a range where the bicycle speed is from V1 to V2. The assisting ratio is zero in a range where the bicycle speed is V2 or higher. The relationship between the assisting ratio and the bicycle speed is not limited to the example shown in FIG. 7. For example, when the bicycle speed is in the range from 0 to V2, the assisting ratio may be gradually decreased.

[Standing-Pedaling Mode Calculation Unit]

The standing-pedaling mode calculation unit 33b calculates a target assisting torque when the standing-pedaling mode is selected. The standing-pedaling mode calculation unit 33b calculates a target assisting torque by a process different from that of the normal-pedaling mode calculation unit 33a (that is, by a method different from that of the normal-pedaling mode). Under the condition that each output of sensors used for calculating the target assisting torque in the standing-pedaling mode, such as bicycle speed and pedaling torque, is the same as that in the normal-pedaling mode, the target assisting torque calculated in the standing-pedaling mode is different from that calculated in the normal-pedaling mode.

[First Example of Standing-Pedaling Mode Calculation Unit]

In an example, the standing-pedaling mode calculation unit 33b calculates an assisting ratio different from the assisting ratio calculated by the normal-pedaling mode calculation unit 33a. The standing-pedaling mode calculation unit 33b may then multiply the calculated assisting ratio and the pedaling torque, and sets the result of the multiplication as the target assisting torque. A map and/or a calculation formula that represent a relationship between the bicycle speed and the assisting ratio for the standing-pedaling mode are stored in advance in the memory. In FIG. 7, a solid line B exemplifies a relationship between the assisting ratio for the standing-pedaling mode and the bicycle speed. In the example of this figure, the assisting ratio is a constant value Rb2 when the bicycle speed is in the range from 0 to V1. In a range where the bicycle speed is from V1 to V2, the assisting ratio gradually decreases. In a range where the bicycle speed is V2 or higher, the assisting ratio is zero. The assisting ratio Rb2 for the standing-pedaling mode is larger than the assisting ratio Ra1 for the normal-pedaling mode. Further, with respect to the range where the bicycle speed is from V1 to V2, the assisting ratio for the standing-pedaling mode is larger than the assisting ratio for the normal-pedaling mode. The assisting ratio described above produces a greater assisting torque in the standing-pedaling mode than that in the normal-pedaling mode.

Note that the assisting ratio for the standing-pedaling mode is not necessarily stored in the memory. For example, a correction value may be added or multiplied to the assisting ratio (for example, the solid line A in FIG. 7) of the normal-pedaling mode, and the result of the correction may be used as the assisting ratio for the standing-pedaling mode.

As still another example, the standing-pedaling mode calculation unit 33b adds or multiplies a correction value to the assisting torque calculated based on a pedaling torque and an assisting ratio calculated from a bicycle speed, and the result of the correction may be used as the target assisting torque.

[Second Example of Standing-Pedaling Mode Calculation Unit]

As described above, the pedaling torque changes due to the rotation of the crank shaft 2 during operation of the bicycle (see FIG. 5 (b). As described above, in the normal-pedaling mode, the target assisting torque is calculated based on a pedaling torque and an assisting ratio. Therefore, in the normal-pedaling mode, the assisting torque output from the electric motor 21 changes due to the rotation of the crank shaft 2. The controller 30 may control the electric motor 21 so that the change of the assisting torque in the standing-pedaling mode is smaller than the change of the assisting torque in the normal-pedaling mode. That is, the controller 30 may control the electric motor 21 so that the amplitude of the assisting torque in the standing-pedaling mode is smaller than the amplitude of the assisting torque in the normal-pedaling mode. For example, under the condition that the bicycle speed and the pedaling torque in the standing-pedaling mode are the same as those in the normal-pedaling mode, the controller 30 may control the electric motor 21 so that local minima of the assisting torque in the standing-pedaling mode is higher than local minima of the assisting torque in the normal-pedaling mode.

Figure 8:
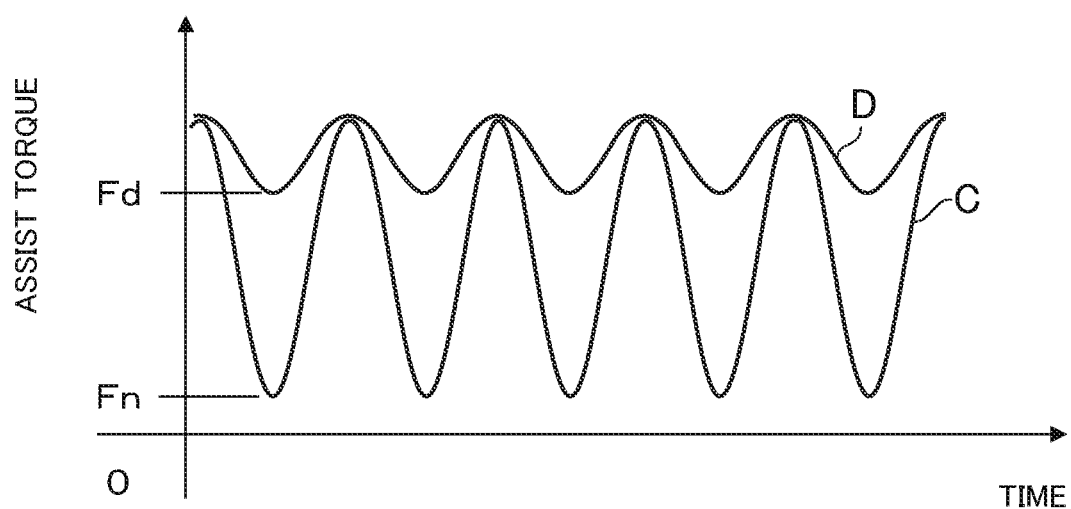
FIG. 8 is a diagram for explaining another example of the process executed by the target assisting torque calculation unit of the controller.

FIG. 8 is a diagram for explaining assisting torque obtained by the process described above. In this figure, the horizontal axis represents time and the vertical axis represents assisting torque. In this figure, the solid line C exemplifies a change of the assisting torque in the normal-pedaling mode, and the solid line D exemplifies a change of the assisting torque in the standing-pedaling mode. As indicated by the solid line C, in the normal-pedaling mode, the assisting torque is a local minimum Fn when the two pedals 2a are respectively positioned near to the highest position and the lowest position. Also, as shown by the solid line D, in the standing-pedaling mode, the assisting torque is a local minimum Fd when the two pedals 2a are positioned near to the highest position and the lowest position, respectively. The local minimum Fd in the standing-pedaling mode is higher than the local minimum Fn in the normal-pedaling mode. Therefore, the amplitude of the assisting torque in the standing-pedaling mode is smaller than the amplitude of the assisting torque in the normal-pedaling mode.

The assisting torque in the standing-pedaling mode indicated by the solid line D can be realized by various methods. For example, the standing-pedaling mode calculation unit 33b executes a filtering process on the assisting torque calculated based on the pedaling torque detected by the torque sensor 41, and then sets the filtered assisting torque as the target assisting torque. As another example, the standing-pedaling mode calculation unit 33b may execute a filtering process on the pedaling torque detected by the torque sensor 41, and then set, as the target assisting torque, the assisting torque calculated based on the filtered pedaling torque. The filter is designed so that the decrease of the target assisting torque is slow. That is, the filter is designed so that the decrease of the assisting torque per unit time is small. The standing-pedaling mode calculation unit 33b may use the filter only when the pedaling torque decreases, that is, only when the pedaling torque changes from the local maximum to the local minimum.

In FIG. 8, the local maximum of the assisting torque in the standing-pedaling mode indicated by the solid line D coincides with the local maximum of the assisting torque in the normal-pedaling mode indicated by the solid line C. The assisting torque in the standing-pedaling mode is not limited to the example shown in FIG. 8. The local maximum of the assisting torque in the standing-pedaling mode may be lower than the local maximum of the assisting torque in the normal-pedaling mode. In this case, the average of the assisting torque in the standing-pedaling mode may be higher than or equal to the average of the assisting torque in the normal-pedaling mode. Alternatively, the average of the assisting torque in the standing-pedaling mode may be lower than the average of the assisting torque in the normal-pedaling mode.

[Third Example of Standing-Pedaling Mode Calculation Unit]

Figure 9:
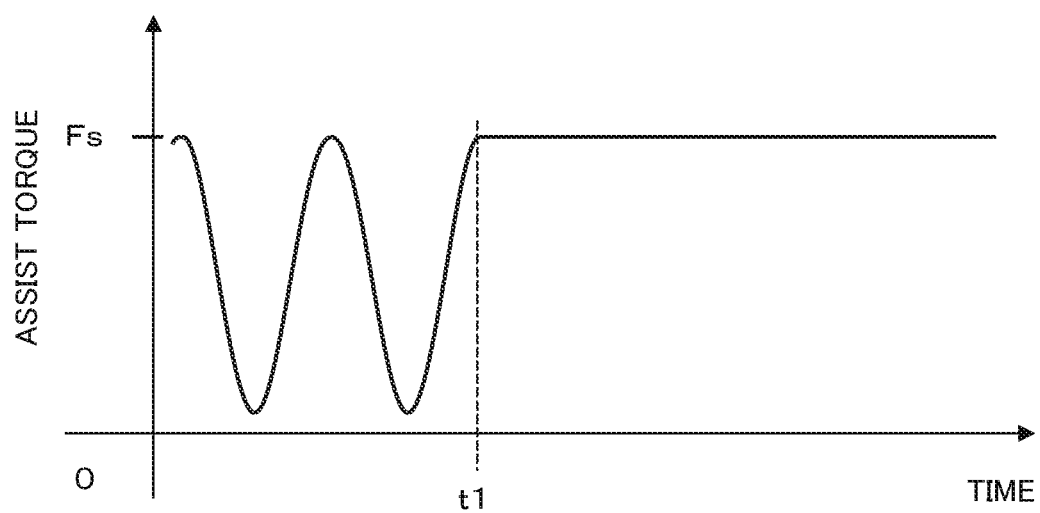
FIG. 9 is a diagram for explaining still another example of the process executed by the target assisting torque calculation unit of the controller.

As still another example, in the standing-pedaling mode, the controller 30 may control the electric motor 21 so that the assisting torque is a constant value. FIG. 9 exemplifies a change of the assisting torque caused when the control mode changes from the normal-pedaling mode to the standing-pedaling mode. In this figure, the horizontal axis represents time. The normal-pedaling mode is selected before a time point t1 and the standing-pedaling mode is selected after the time point t1.

As described above, the pedaling torque changes due to the rotation of the crank shaft 2. In the normal-pedaling mode, the target assisting torque is calculated based on the pedaling torque. Therefore, as shown in FIG. 9, in the period of the normal-pedaling mode (that is, in the period before the time point t1), the assisting torque changes corresponding to the rotation of the crank shaft 2. On the other hand, in the standing-pedaling mode, the standing-pedaling mode calculation unit 33*b* sets, as the target assisting torque, a constant value Fs without regard to the change of the pedaling torque.

The value Fs which is the target assisting torque is stored in the memory of the controller 30, for example. The target assisting torque fs may correspond to bicycle speed. In this case, the standing-pedaling mode calculation unit 33*b* calculates the bicycle speed based on the output signal of a sensor, for example, the front wheel rotation speed sensor 43, and then obtains a target assisting torque Fs corresponding to the bicycle speed from the memory.

Alternatively, the target assisting torque is which is a constant value may be calculated based on the local maximum of the pedaling torque. Referring to FIG. 9, for example, a target assisting torque may be calculated based on the pedaling torque at the time point t1 at which the control mode switches from the normal-pedaling mode to the standing-pedaling mode, and then is set as the target assisting torque Fs.

[Other Examples of Standing-Pedaling Mode Calculation Unit]

When the pedaling torque detected by the torque sensor 41 in the standing-pedaling mode is the same as that in the normal-pedaling mode, the electric motor 21 is controlled so that the power (torque×rotation speed) of the electric motor 21 obtained in the standing-pedaling mode is different from the power of the electric motor 21 obtained in the normal-pedaling mode. In an example, the controller 30 controls the electric motor 21 so that the power obtained in the standing-pedaling mode is larger than the power obtained in the normal-pedaling mode. That is, under the condition that the bicycle speed and the pedaling torque in the standing-pedaling mode are the same as those in the normal-pedaling mode, the standing-pedaling mode calculation unit 33*b* calculates the target assisting torque so that the power obtained in the standing-pedaling mode is larger than the power obtained in the normal-pedaling mode. For example, as described with reference to FIG. 7, the higher assisting ratio increases the power of the electric motor 21 in the standing-pedaling mode. Alternatively, the power of the electric motor 21 may be increased by increasing the local minimum of the target assisting torque as described with reference to FIG. 8, or by setting the target assisting torque to the constant value as described with reference to FIG. 9. Note that the processes of the controller 30 are not limited to the examples described above. The standing-pedaling mode calculation unit 33*b* may calculate the target assisting torque so that the power of the electric motor 21 in the standing-pedaling mode is smaller than, or equal to, the power of the electric motor 21 obtained in the normal-pedaling mode.

When a difference between the target assisting torque in the normal-pedaling mode and the target assisting torque in the standing pedaling mode is large, the target assisting torque calculation unit 33 may gradually change the target assisting torque when the control mode changes from the normal-pedaling mode to the standing pedaling mode.

[Motor Control Unit]

The controller 30 has a motor control unit 34 (see FIG. 4) as described above. The motor control unit 34 calculates a command value of electric current corresponding to the target assisting torque calculated by the target assisting torque calculation unit 33 and then output the command value to the motor driver 39. The motor driver 39 supplies electric current corresponding to the command value to the electric motor 21. The motor control unit 34 calculates the rotation speed of the electric motor 21 based on the output signal of the motor rotation speed sensor 42 and monitors whether the drive of the electric motor 21 is in conformity with the command value.

[Notification Control Unit]

As shown in FIG. 2, the electric power-assisted bicycle 100 includes a notification device 59. The notification device 59 is for notifying the rider that the control of the electric motor 21 is being executed in the standing-pedaling mode. The notification device 59 includes, for example, a light emitting element (for example, a light emitting diode (LED)), a display device, or a speaker. As shown in FIG. 4, the controller 30 has a notification control unit 35 that controls the notification device 59. When the standing-pedaling mode is selected by the mode selection unit 32, the notification control unit 35 notifies the rider of the selection by sound, light, and an image produced by the notification device.

[Modifications of Electric Power-Assisted Bicycle]

The present invention is not limited to the electric power-assisted bicycle 100 described above, and various modifications are possible.

[Utilization of Acceleration Sensor]

Figure 10:
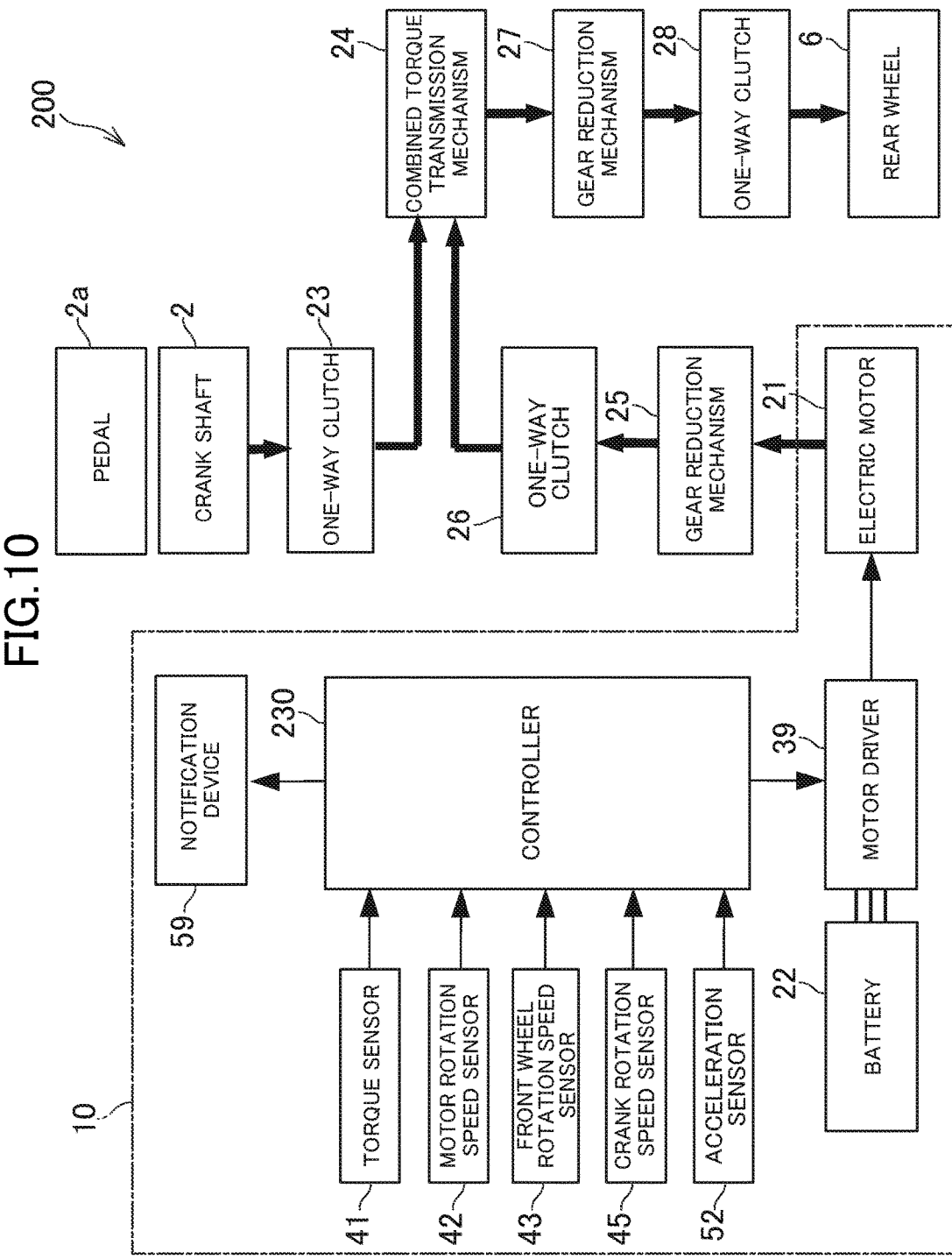
FIG. 10 is a block diagram showing a modification of the electric power-assisted bicycle shown in FIG. 2.

FIG. 10 is a block diagram showing a modified example of the electric power-assisted bicycle 100 and the drive system 10 described above. The electric power-assisted bicycle 200 and the drive system 210 shown in this figure includes, instead of the inclination angle sensor 51, a sensor that outputs signal corresponding to the acceleration in the lateral direction of the bicycle body for determining whether or not the rider pedals while rocking the bicycle body to the right and the left. The acceleration sensor 52 is, for example, a uniaxial acceleration sensor having a single detection direction. The acceleration sensor 52 may be a two-axis acceleration sensor or a three-axis acceleration sensor. The controller 230 determines whether the standing-pedaling is being performed, based on the output of the acceleration sensor 52, that is, the acceleration in the lateral direction of the bicycle body. Hereinafter, the acceleration in the lateral direction of the bicycle body is referred to as "lateral acceleration."

The controller 230 of the electric power-assisted bicycle 200 determines whether or not the standing-pedaling is being performed, based on the lateral acceleration acquired in a period or at a time point specified by using the pedaling torque. More specifically, the controller 230 calculates the peak value of the lateral acceleration in a period or at a time point specified by time points of the peak values (local maximum and local minimum) of the pedaling torque. The controller 230 may then determine that the standing-pedaling is being performed when the absolute value of the peak value is larger than a threshold value. Instead of the pedaling torque, the controller 230 may use the rotation speed and the rotational acceleration of the crank shaft 2.

Figure 11:
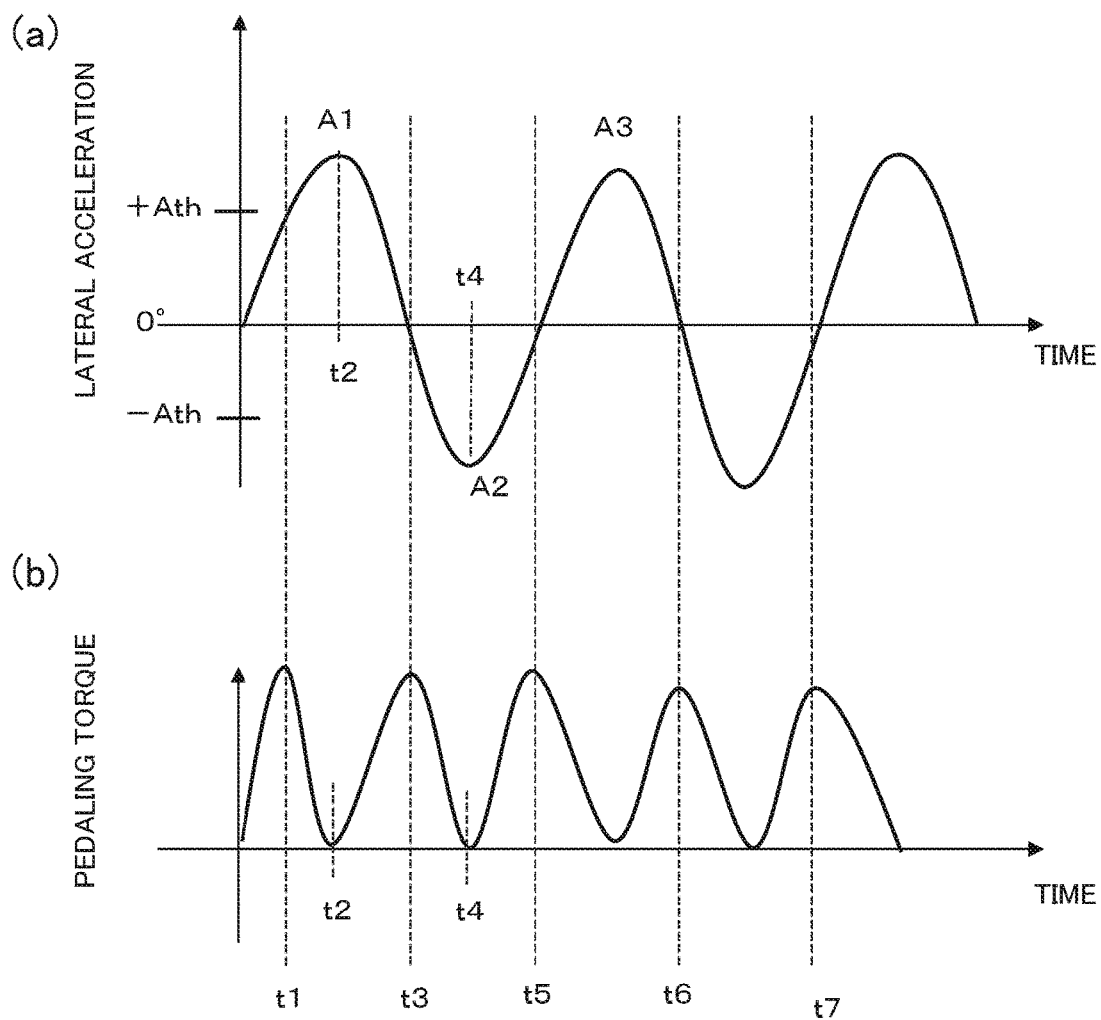
FIG. 11 is a diagram for explaining a process of the controller of the electric power-assisted bicycle shown in FIG. 10.

FIG. 11 is a diagram for explaining the processing executed by the controller 230 of the electric power-assisted bicycle 200. FIG. 11(*a*) illustrates a change in the lateral acceleration in the standing-pedaling. FIG. 11 (*b*) illustrates a change in the pedaling torque in the standing-pedaling. In FIG. 11, the horizontal axis represents time. The change in the pedaling torque shown in FIG. 11 (b) is the same as the change in the pedaling torque shown in FIG. 5 (b).

As described above, when the standing-pedaling is being performed, the bicycle body is most inclined to either the right or the left when the two pedals 2a are located at the highest position and the lowest position, respectively. Also, at the time point when the two pedals 2a are located at the highest position and the lowest position, the pedaling torque is small. Therefore, the lateral acceleration becomes a local maximum or a local minimum at the time points at which the pedaling torque is a local minimum (for example, at the time points t2 and t4 in FIG. 11). That is, as shown in FIG. 11 (a), the lateral acceleration periodically changes due to the rotation of the crank shaft 2, similarly to the inclination angle described with reference to FIG. 5. Therefore, the controller 230 can execute a similar processing to that of the controller 30 of the electric power-assisted bicycle 100.

In one example, the standing-pedaling determination unit 31 (see FIG. 4) of the controller 230 detects peak values of the lateral acceleration (each peak value is a local maximum or a local minimum obtained in a period between two time points each having a local maximum of the pedaling torque). The standing-pedaling determination unit 31 may then determine whether or not the absolute values of the peak values are larger than a threshold value. The standing-pedaling determination unit 31 may then determine whether or not the signs (+ or −) of two consecutive peak values are different. This process enables the standing-pedaling determination unit 31 to determine whether or not the bicycle body is rocking in the left and right in conformity with the rotation of the crank shaft 2 and determine whether the rocking is sufficiently large. When the plurality of results of those determinations are positive (Yes) consecutively, the standing-pedaling determination unit 31 determines that the standing-pedaling is being performed. Referring to FIG. 11, the standing-pedaling determination unit 31 calculates a peak value (local maximum) A1 of the lateral acceleration in the period between two time points (for example, t1 and t3) each having a local maximum of the pedaling torque. The standing-pedaling determination unit 31 may then determine whether or not the peak value A1 is greater than a threshold Ath. Further, the standing-pedaling determination unit 31 calculates a peak value (local minimum) A2 of the lateral acceleration in the next period between two time points (for example, t3 and t5) each having a local maximum of the pedaling torque. The standing-pedaling determination unit 31 may then determine whether or not the absolute value of the peak value A2 is larger than the threshold Ath. Further, standing-pedaling determination unit 31 determines whether or not the sign or (+ or −) of the peak value A2 is different from the sign of the peak value A1. When the results of those determinations are positive (Yes), the standing-pedaling determination unit 31 determines that the standing-pedaling is being performed. The number of times of the determinations is not limited to two. The standing-pedaling determination unit 31 may detect a peak value A3 of the lateral acceleration in the further next period between two time points (for example, t5 and t6) each having a local maximum of the pedaling torque. The standing-pedaling determination unit 31 may then determine whether or not the absolute value of the peak value A3 is larger than the threshold Ath, and determine whether or not the sign of the peak value A3 is different from the sign of the previous peak value A2. When the results of those three consecutive determinations are positive (Yes), the standing-pedaling determination unit 31 may determine that the standing-pedaling is being performed. The number of times of the determinations may be more than three times.

In addition to the above described determinations, the standing-pedaling determination unit 31 may determine whether or not the local maximum of the pedaling torque is larger than a threshold.

FIG. 12 is a flowchart showing an example of processing executed by the standing-pedaling determination unit 31 in the electric power-assisted bicycle 200. The process shown in FIG. 12 is executed repeatedly at a predetermined cycle during running of the bicycle. The processing illustrated in FIG. 12 differs from the processing illustrated in FIG. 6 in that the lateral acceleration is used instead of the inclination angle, and is the same as the processing illustrated in FIG. 6 in other respects.

First, the standing-pedaling determination unit 31 acquires a lateral acceleration and a pedaling torque (S201). The standing-pedaling determination unit 31 updates a possible peak value already stored in the memory (S202). Specifically, when the absolute value of the lateral acceleration acquired in S101 is larger than the absolute value of the lateral acceleration already recorded in the memory, the standing-pedaling determination unit 31 newly sets, as the possible peak value, the lateral acceleration acquired in S201 in the memory. On the other hand, if the absolute value of the lateral acceleration acquired in S201 is smaller than the absolute value of the lateral acceleration already recorded in the memory, the lateral acceleration already recorded in the memory is maintained as the possible peak value. As a result of this processing, a peak value (for example, the peak value A2 in FIG. 11) is recorded in the memory.

Next, the standing-pedaling determination unit 31 determines whether or not the pedaling torque acquired in S201 is a local maximum (S203). When the pedaling torque is a local maximum in the determination of S103, the standing-pedaling determination unit 31 determines whether or not the absolute value of the lateral acceleration (the possible peak value) recorded in the memory is larger than a threshold (S204). Specifically, referring to FIG. 11, the standing-pedaling determination unit 31 determines whether or not the absolute value of the peak value A2 is greater than the threshold Ath, for example. If the peak value recorded in the memory is larger than the threshold value in the determination of S204, the standing-pedaling determination unit 31 determines whether or not the number of times of the positive (Yes) results of the determinations of S204, that is, inclination count number i described above, is greater than zero (S205). In the case where the inclination count number i is zero (the result of the determination in S205 is "No"), the standing-pedaling determination unit 31 sets the inclination count number i to 1 (S207). When the inclination count number i is 1 or more in the determination of S205 (when the result of the determination in is "Yes"), the standing-pedaling determination unit 31 determines whether or not the sign (+ or −) of the lateral acceleration (for example, the peak value A2 in FIG. 11) is different from the sign of the previous peak value (for example, the peak value us A1 in FIG. 11) (S206). When the signs of the two peak values are different from each other, the standing-pedaling determination unit 31 increases the inclination count number i by 1 (S207). The standing-pedaling determination unit 31 may then determine whether or not the inclination count number i is equal to or larger than a predetermined number n (S208). When the inclination count number i is equal to or larger than the predetermined number n, the standing-pedaling determination unit 31 determines that standing-pedaling is being performed and sets the "standing-pedaling flag" recorded in the memory to ON (S209). When the absolute value of the lateral acceleration (peak value) recorded in the memory is smaller than the threshold in the determination of S204, that is, when the absolute value of the peak values A1, A2 shown in FIG. 11 is smaller than the threshold Ath, the standing-pedaling determination unit 31 returns the inclination count number i to zero (S210). Also, when, in the determination of S206, the sign of the lateral acceleration (peak value) recorded in the memory is the same as the sign of the peak value of the lateral acceleration acquired in the previous period, that is, if the result of the determination of S206 is "No", the standing-pedaling determination unit 31 returns the inclination count number i to zero (S210). When the inclination count number i is returned to zero, the standing-pedaling determination unit 31 sets the standing-pedaling flag to OFF (S211).

When, in the determination of S208, the inclination count number i is smaller than the predetermined number n, that is, when the result of the determination in S208 is "No", the standing-pedaling determination unit 31 sets the "standing-pedaling flag" recorded to OFF (S211).

According to the process described in FIG. 12, the standing-pedaling determination unit 31 determines that standing-pedaling is being performed when the sign (+ or −) of the peak value (local maximum or local minimum) of the lateral acceleration changes a plurality of times and it is consecutively determined a plurality of times that the absolute values of the peak values are larger than the threshold.

The processing of the standing-pedaling determination unit 31 of the electric power-assisted bicycle 200 is not limited to the above example. The standing-pedaling determination unit 31 may use the change period of the lateral acceleration and the change period of the pedaling torque. The standing-pedaling determination unit 31 may determine that the standing-pedaling is being performed, for example, when (i) the absolute value of the peak value of the lateral acceleration is larger than a threshold value, (ii) a difference between the change period of the lateral acceleration (for example, a period from a local maximum to a local minimum) and the change period of the pedaling torque (for example, a period from a local maximum to a local maximum) is smaller than a threshold value.

[Modifications of Target Assisting Torque Calculation Unit]

Further, the control in the normal-pedaling mode and the control in the standing-pedaling mode are not limited to the examples described with reference to FIGS. 7 to 9.

The controller 30, 230 may control she electric motor 21 so that the amplitude of the assisting torque in the standing-pedaling mode is larger than the amplitude of the assisting torque in the normal-pedaling mode. For example, in the normal-pedaling mode, the normal-pedaling mode calculation unit 33a may calculate the target assisting torque described with reference to the solid line D in FIG. 8. Specifically, the normal-pedaling mode calculation unit 33a may calculate the target assisting torque indicated by the solid line D by applying a filtering process on the target assisting torque calculated based on the pedaling torque. Alternatively, the normal-pedaling mode calculation unit 33a may calculate the target assisting torque indicated by the solid line D by applying a filtering process on the pedaling torque detected by the torque sensor 41. On the other hand, the standing-pedaling mode calculation unit 33b may calculate the target assisting torque that changes according to the pedaling torque (the output of the torque sensor 41). In other words, unlike the normal-pedaling mode calculation unit 33a, the standing-pedaling mode calculation unit 33b does not use the filtering process.

As still another modification, the normal-pedaling mode calculation unit 33a may calculate a constant value as the target assisting torque. For example, when the rotation speed of the crank shaft 2 is higher than a threshold value in the normal-pedaling mode, the normal-pedaling mode calculation unit 33a may calculate a constant value as the target assisting torque. In other words, the controller 30, 230 may control the electric motor 21 in the normal-pedaling mode so that the assisting torque is constant without regard to the change of the pedaling force applied to the pedals 2a. On the other hand, the controller 30, 230 may control the electric motor 21 in the standing-pedaling mode so that the change in assisting torque occurs. That is, the standing-pedaling mode calculation unit 33b may calculate the target assisting torque that changes according to the pedaling torque (the output of the torque sensor 41).

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A drive system for an electric power-assisted bicycle, comprising:
　a first sensor for detecting pedaling force applied to a pedal from a rider;
　a second sensor for detecting rocking of a bicycle body in a lateral direction;
　an electric motor that assists drive of a drive wheel driven by pedaling of the rider; and
　a controller that controls the electric motor based on a pedaling force, wherein
　the controller has a first mode and a second mode as control modes of the electric motor, the first mode is executed in a normal-pedaling mode, the second mode is executed when the controller determines based on at least output of the second sensor that the rider pedals the bicycle while rocking the bicycle body in the lateral direction, and the controller executes different control in the second mode from that in the first mode to assist the drive of the drive wheel.

2. The drive system for the electric power-assisted bicycle according to claim 1, wherein
　under a condition that another pedaling force detected by the first sensor in the second mode is the same as that in the first mode, power obtained from the electric motor in the second mode is different from that in the first mode.

3. The drive system for the electric power-assisted bicycle according to claim 1, wherein
　when an inclination of the bicycle body in one direction of either a left direction or a right direction is defined as a first inclination and an inclination of the bicycle body in the other direction of either the left direction or the right direction is defined as a second inclination, the controller determines that the rider pedals the bicycle while rocking the bicycle body in the lateral direction when the first inclination and the second inclination are detected a plurality of times.

4. The drive system for the electric power-assisted bicycle according to claim 1, wherein the controller detects an inclination angle in the lateral direction of the bicycle body based on the output of the second sensor, and the controller determines that the rider pedals the bicycle while rocking the bicycle body in the lateral direction based on the inclination angle in the lateral direction of the bicycle body.

5. The drive system for the electric power-assisted bicycle according to claim 1, wherein the controller detects an acceleration in the lateral direction of the bicycle body based on the output of the second sensor, and the controller determines that the rider pedals the bicycle while rocking the bicycle body in the lateral direction based on the acceleration in the lateral direction of the bicycle body.

6. The drive system for the electric power-assisted bicycle according to claim 1, further comprising a sensor that has output depending on a rotation position of the pedal, wherein the controller determines that the rider pedals the bicycle while rocking the bicycle body in the lateral direction, based on the output of the second sensor and the output of the sensor depending on the rotation position of the pedal.

7. The drive system for the electric power-assisted bicycle according to claim 6, wherein the first sensor is used as the sensor that has output depending on the rotation position of the pedal.

8. The drive system for the electric power-assisted bicycle according to claim 6, further comprising a third sensor for detecting rotation of a crank shaft provided with the pedal, wherein the third sensor is used as the sensor that has output-depending on the rotation position of the pedal.

9. The drive system for the electric power-assisted bicycle according to claim 1, wherein the controller controls the electric motor in the first mode so that the electric motor outputs an assisting torque corresponding to a first assisting ratio and the pedaling force detected by the first sensor, and the controller controls the electric motor in the second mode so that the electric motor outputs an assisting torque corresponding to a second assisting ratio that is different from the first assisting ratio and the pedaling force detected by the first sensor.

10. The drive system for the electric power-assisted bicycle according to claim 1, wherein the controller controls the electric motor in the first mode so that the assisting torque output from the electric motor changes due to rotation of a crank shaft provided with the pedal, and the controller controls the electric motor in the second mode so that a local minimum of the assisting torque in the second mode is higher than a local minimum of the assisting torque in the first mode.

11. The drive system for the electric power-assisted bicycle according to claim 1, wherein the controller controls the electric motor in the second mode so that amplitude of the assisting torque in the second mode is smaller than amplitude of the assisting torque in the first mode.

12. The drive system for the electric power-assisted bicycle according to claim 1, wherein the controller controls the electric motor in the second mode so that amplitude of the assisting torque in the second mode is larger than amplitude of the assisting torque in the first mode.

13. The drive system for the electric power-assisted bicycle according to claim 12, wherein the controller controls the electric motor in the first mode so that the assisting torque is constant without regard to change of the pedaling force applied to the pedal, and the controller controls the electric motor in the second mode so that the assisting torque changes.

14. The drive system for the electric power-assisted bicycle according to claim 1, further comprising a notification device that notifies the rider that the controller controls the electric motor in the second mode.

15. An electric power-assisted bicycle including a drive system, the drive system comprising:

a first sensor for detecting pedaling force applied to a pedal from a rider;

a second sensor for detecting rocking of the bicycle body in a lateral direction;

an electric motor that assists drive of a drive wheel driven by pedaling of the rider; and a controller that controls the electric motor based on a pedaling force, wherein the controller has a first mode and a second mode as control modes of the electric motor, the first mode is executed in a normal-pedaling mode, the second mode is executed when the controller determines based on at least output of the second sensor that the rider pedals the bicycle while rocking the bicycle body in the lateral direction, and the controller executes different control in the second mode from that in the first mode to assist the drive of the drive wheel.

* * * * *